(12) United States Patent
Batra et al.

(10) Patent No.: US 7,376,174 B2
(45) Date of Patent: May 20, 2008

(54) RAKE RECEIVER ARCHITECTURE FOR AN ULTRA-WIDEBAND (UWB) RECEIVER

(75) Inventors: Anuj Batra, Dallas, TX (US); Anand G. Dabak, Plano, TX (US); Ranjit Gharpurey, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 663 days.

(21) Appl. No.: 10/335,803

(22) Filed: Jan. 2, 2003

(65) Prior Publication Data

US 2003/0227961 A1 Dec. 11, 2003

Related U.S. Application Data

(60) Provisional application No. 60/386,821, filed on Jun. 7, 2002.

(51) Int. Cl.
*H04B 1/69* (2006.01)
(52) U.S. Cl. .................................. 375/142; 375/349
(58) Field of Classification Search ............. 375/267, 375/347, 343, 130, 140, 144, 147, 142, 349; 455/132
See application file for complete search history.

(56) References Cited

U.S. PATENT DOCUMENTS

| | | | | |
|---|---|---|---|---|
| 2,910,255 A | | 10/1959 | Johnson | 244/129 |
| 3,851,845 A | | 12/1974 | Edwards | 244/129 |
| 5,325,394 A | * | 6/1994 | Bruckert | 375/148 |
| 5,610,939 A | * | 3/1997 | Takahashi et al. | 375/150 |
| 5,960,033 A | * | 9/1999 | Shibano et al. | 375/152 |
| 6,278,724 B1 | * | 8/2001 | Zhou et al. | 375/147 |
| 6,301,294 B1 | * | 10/2001 | Hara et al. | 375/152 |
| 2003/0078007 A1 | * | 4/2003 | Parssinen et al. | 455/67.1 |
| 2003/0227961 A1 | * | 12/2003 | Batra et al. | 375/147 |

FOREIGN PATENT DOCUMENTS

| | | |
|---|---|---|
| EP | 0 876 954 A2 | 11/1998 |
| EP | 0 876 954 A3 | 3/1999 |
| GB | 2 181 780 | 4/1987 |

\* cited by examiner

*Primary Examiner*—Khai Tran
(74) *Attorney, Agent, or Firm*—Ronald O. Neerings; Wade J. Brady, III; Frederick J. Telecky, Jr.

(57) ABSTRACT

System and method for combining maximizing a received signal in a multipath environment. A preferred embodiment comprises a rake receiver (for example, rake receiver 1100), created from switched capacitors, with N fingers. Each of the fingers is coupled to a signal input for a period of time to accumulate a charge on a storing capacitor (for example, storing capacitor 1115). The charges stored on the storing capacitors can then be read-out to produce a value. The rake receiver can implement either equal ratio combining or maximum gain combining to further improve received signal strength.

16 Claims, 12 Drawing Sheets

RAKE RECEIVER ARCHITECTURE FOR AN ULTRA-WIDEBAND (UWB) RECEIVER

This application claims the benefit of U.S. Provisional Application No. 60/386,821, filed on Jun. 7, 2002, entitled "Ultra-Wideband (UWB) Receiver and Transmitter Architecture," which application is hereby incorporated herein by reference.

CROSS-REFERENCE TO RELATED APPLICATIONS

This application is related to the following co-pending and commonly assigned patent applications: Ser. No. 10/335,717, filed Jan. 1, 2003, entitled "Ultra-Wideband (UWB) Transmitter Architecture;" Ser. No. 10/335,769, filed Jan. 1, 2003, entitled "Simple Correlator and Integrator for an Ultra-Wideband (UWB) Receiver;" which applications are hereby incorporated herein by reference.

TECHNICAL FIELD

The present invention relates generally to a system and method maximizing a received signal's power, and more particularly to a system and method for using signal multipath to increase the received signal's power via the use of a hardware switched capacitor rake receiver with equal gain and maximum ratio combining and a self-adjusting signal detector.

BACKGROUND

Generally, when a wireless signal is transmitted over-the-air, reflections of the signal will occur whenever the signal encounters a solid surface, for example, buildings, bridges, large rocks (hills and mountains), walls, etc. The original wireless signal and the reflections will then scatter and arrive at a destination at different times. This is commonly referred to as multipath. Each time that a reflection occurs, a net reduction of the original wireless signal's strength is seen, since the surface that the original wireless signal reflects from absorbs a portion of the original wireless signal and the reflection itself takes away a part of the original wireless signal.

Multipath can be a problem when it comes to the proper reception of the transmitted signal, with the reflections interfering with the original wireless signal and degrading system performance. Multipath occurs in many wireless communications systems, from uni-directional systems such as AM/FM radio to bi-directional systems like cellular telephones and geosynchronous satellite based communications systems. In an ultra-wideband (UWB) communications system that may use a stream of short-duration pulses, the reflections of the pulses can be readily distinguished from the original pulse due to the fact that the pulses are of short-duration and there is normally no mingling of the original pulse and any of the reflections. In wireless communications systems with a continuously transmitted signal or wherein the signal length is longer than a typical multipath delay, problems may arise from the intermingling of the original signal and the reflections and special techniques must be employed to separate the signal from the reflections.

However, in systems where the multipath delay is greater than the signal length, it is possible to easily combine the received original wireless signal (attenuated by distance traveled and reflections lost) with the received reflections to maximize the received signal strength. A commonly used technique employs what is commonly referred to as a rake receiver. The rake receiver has multiple "fingers" that measures the received signal at various points in time, hoping to capture the reflections of the original wireless signal. The signals measured by the fingers are then combined so that the received signal strength is maximized.

Rake receivers are commonly implemented in software and make use of existing receivers. This permits the benefits of rake receivers without significantly increasing the cost of the receiver or requiring the re-design of a receiver without a rake receiver to include the rake receiver.

Additionally, in wireless communications systems that use the precise arrival of signals and pulses, a slight mismatch between the actual arrival time of the signal and the expected arrival time of the signal can result in a significant reduction in the received signal strength. This is often due to a misalignment between the signal and a correlator/integrator that is used to detect the arrival of the signal and to produce a value that is proportional to the received signal strength of the signal. It is therefore, vital to align the correlator/integrator with the received signal to maximize the available received signal strength.

However, since the arrival times of the signal can vary, either on purpose (such as due to a modulation scheme) or through error (via clock drift, etc.), a method of simply using historical timing information derived from previously arrived signals is generally not adequate. Even techniques that use the most recently received signal to predict the arrival of the next signal may not provide optimal performance. This is especially true in an ultra-wideband (UWB) wireless communications system that makes use of a stream of short-duration pulses to encode and convey information. Depending on the modulation scheme used, the actual arrival time of the short-duration pulses may be varied to convey information.

One disadvantage of the prior art is that many of the rake receivers are implemented via software, using existing receiver hardware. While this can minimize any additional hardware costs involved with the implementation of a rake receiver, the fact that the rake receiver is implemented in software can place limits on a maximum speed at which the rake receiver can operate. Therefore, if the incoming signals are arriving too quickly, then the software rake receiver may not be able to measure a significant number of the reflections to significantly improve the received signal strength.

A second disadvantage of the prior art is that while existing rake receivers can increase the received signal strength by combining reflections of the received signal, if the received signals and the reflections themselves are not at a maximum signal strength, then system performance can suffer.

Yet another disadvantage of the prior art is that historical timing information cannot be reliably used to detect the arrival of future signals. This is due to problems associated with clock drive and even modulation schemes.

SUMMARY OF THE INVENTION

These and other problems are generally solved or circumvented, and technical advantages are generally achieved, by preferred embodiments of the present invention which provide an UWB receiver that features a rake receiver built in. Additionally, the UWB receiver has a signal detector with self-adjusting timing so that the received signal and its reflections are maximized prior to being sent to the rake receiver for further received signal strength enhancement.

In accordance with a preferred embodiment of the present invention, a method for maximizing a received signal strength comprising storing a first value corresponding to a measurement of a received signal over a first storing time, wherein the first value is stored as a charge on a first capacitor, storing a second value corresponding to a measurement of the received signal over a second storing time, wherein the second value is stored as a charge on a second capacitor, and combining the first and second values.

In accordance with another preferred embodiment of the present invention, a circuit comprising a signal input, a plurality of fingers coupled to the signal input, each finger comprising, a first switch controlled by a control signal, the second switch to decouple the finger from the signal input, a storing capacitor coupled to the switch, the storing capacitor to accumulate a charge when the finger is coupled to the signal input, and a second switch coupled to the storing capacitor, the second switch to couple the storing capacitor to another storing capacitor in an adjacent finger.

In accordance with another preferred embodiment of the present invention, an ultra-wideband (UWB) receiver comprising a signal input, a pulse detector coupled to the signal input, the pulse detector containing circuitry to maximize a signal strength of a signal provided by the signal input, a rake receiver coupled to the pulse detector, the rake receiver comprising a plurality of fingers coupled to an output of the pulse detector, each finger comprising a first switch controlled by a control signal, the first switch to decouple the finger from the signal input, a storing capacitor coupled to the switch, the storing capacitor to accumulate a charge when the finger is coupled to the signal input, a second switch coupled to the storing capacitor, the second switch to couple the storing capacitor to another storing capacitor in an adjacent finger, and the UWB receiver further comprising a signal processing unit coupled to the rake receiver, the signal processing unit containing circuitry to convert an analog signal into a digital bit stream and decode the digital bit stream into a data stream.

An advantage of a preferred embodiment of the present invention is the rake receiver is implemented in hardware, out of switched capacitors. This makes for a rake receiver that can operate at very high frequencies and suitable for high data rate wireless communications systems.

A further advantage of a preferred embodiment of the present invention is that although the rake receiver is a hardware rake receiver, the use of switched capacitors makes the rake receiver relatively inexpensive to implement.

Yet another advantage of a preferred embodiment of the present invention is that the design of the rake receiver permits the use of either equal gain combining or maximum ratio combining in a single rake receiver design.

A further advantage of a preferred embodiment of the present invention is that the combined use of the rake receiver with the signal detector with self-adjusting timing will further enhance received signal strength by maximizing the received signal and reflections prior to their being combined by the rake receiver.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an UWB wireless communications system using streams of short-duration pulses and a bi-phase modulation scheme. The invention may also be applied, however, to other UWB wireless communications systems using any modulation scheme, and other wireless communications scheme wherein the multipath delay is greater than the duration of a single signal transmission.

Figure 1:
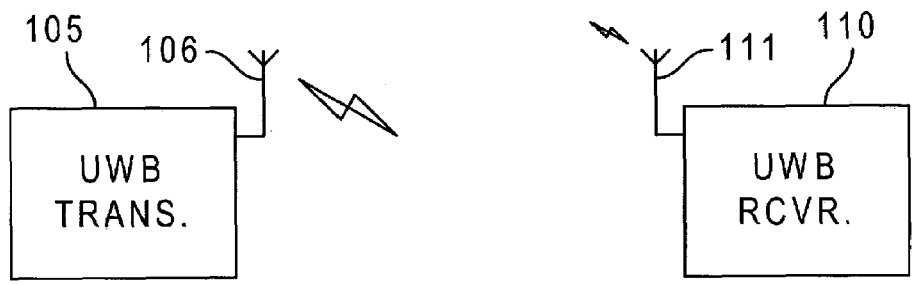
FIG. 1 is a diagram of an exemplary ultra-wideband (UWB) wireless communications system.

With reference now to FIG. 1, there is shown an exemplary ultra-wideband (UWB) wireless communications system. The UWB wireless communications system as displayed includes an UWB transmitter 105 and an UWB receiver 110. Note that while the UWB wireless communications system is illustrated with a single receiver, there can be and typically are more than one receiver in a single wireless communications system.

A majority of UWB communications systems use streams of short duration pulses to encode and transmit data, although in the strictest sense, any wireless communications system is classified as an UWB communications system if the bandwidth of the signal being transmitted, $f_B$, is greater than or equal to 0.2 $f_C$, where $f_C$ is the center frequency of the signal being transmitted. Additionally, the UWB communications system should have a minimum bandwidth of 500 MHz. Therefore, other data encoding and transmission methodologies can be employed by UWB communications systems.

Figure 2A:
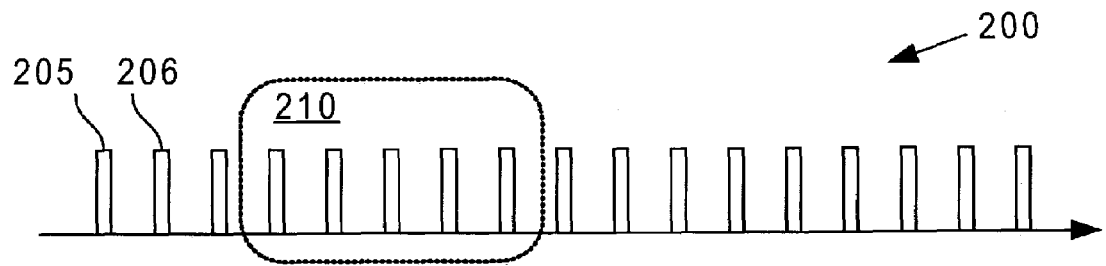
FIGS. 2a-2d are diagrams of an exemplary stream of short duration pulses and several modulations schemes for the streams.

With reference now to FIG. 2a, there is shown an exemplary pulse stream 200, wherein the pulses are of short duration. The exemplary pulse stream 200 may be an output of an UWB transmitter which is part of an UWB communications system. The exemplary pulse stream 200 is made up of a series of short duration pulses, for example, pulses 205 and 206. Prior to being modulated, the pulses 205 and 206 are essentially identical (or as close to being identical as possible). A group of pulses 210 is highlighted to illustrate several commonly used modulation techniques. Note that although the pulses, for example, pulses 205 and 206, are illustrated as being essentially square in shape, in practice, pulses of a variety of different shapes, for example, Gaussian pulses, may actually be preferred over the square pulses due to difficulties in generating square pulses.

Figure 2B:
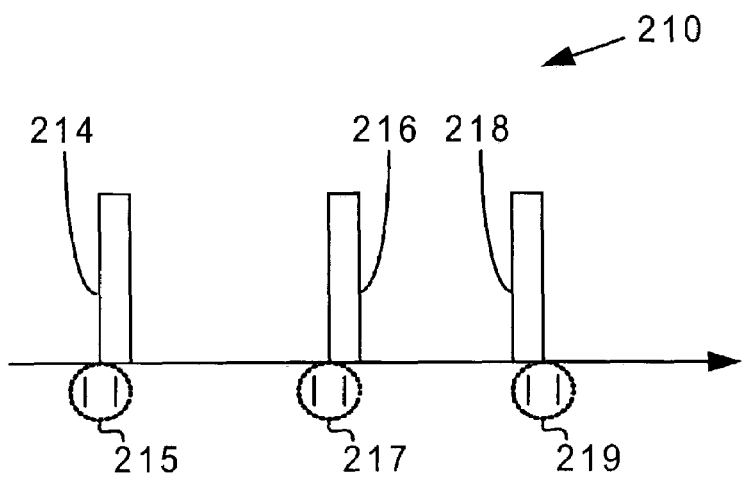

With reference now to FIG. 2b, there is shown the group of pulses 210, wherein the pulses are modulated using pulse position modulation (PPM), with time increasing towards the right. PPM varies the position of the pulses in order to encode the data. For example, three pulses 214, 216, and 218 can be used to illustrate PPM. The first pulse 214 appears slightly delayed of where it is expected to appear, as indicated by highlight 215. The second pulse 216 is slightly delayed and appears a small amount of time after when it was expected to appear, as shown by highlight 217. Finally, the third pulse 218 is slightly advanced and appears a small amount of time prior to when it was expected to appear, as shown by highlight 217. PPM uses either the advanced or delayed appearance of a pulse with respect to its expected appearance to convey data.

Figure 2C:
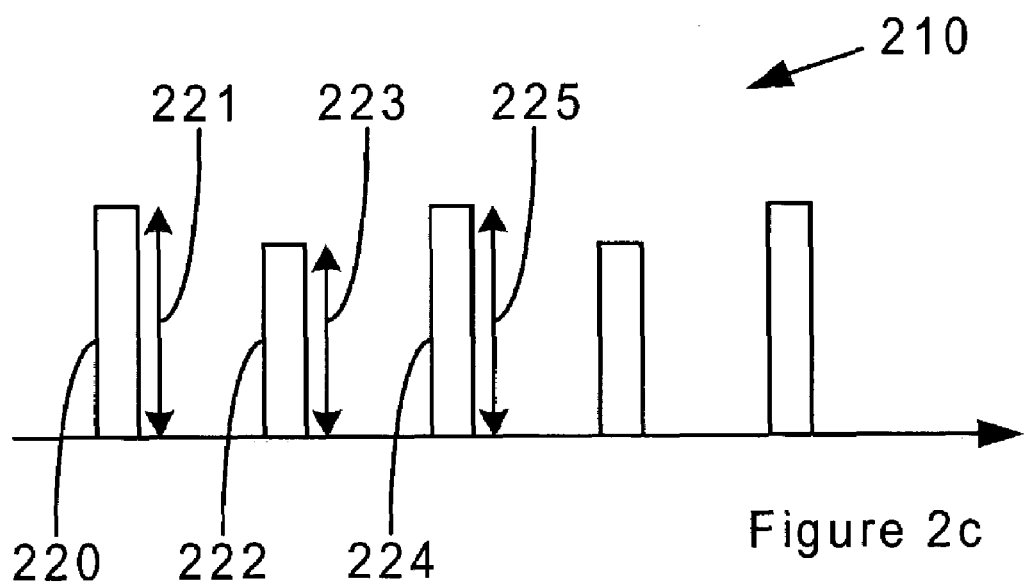

With reference now to FIG. 2c, there is shown the group of pulses 210, wherein the pulses are modulated using pulse amplitude modulation (PAM). PAM varies the amplitudes of the pulses to encode the data while leaving the positions of the pulses untouched. For example, pulses 220 and 222 vary in amplitude from each other, as indicated by markers 221 and 223. While pulse 224 has the sample amplitude as the pulse 220.

Figure 2D:
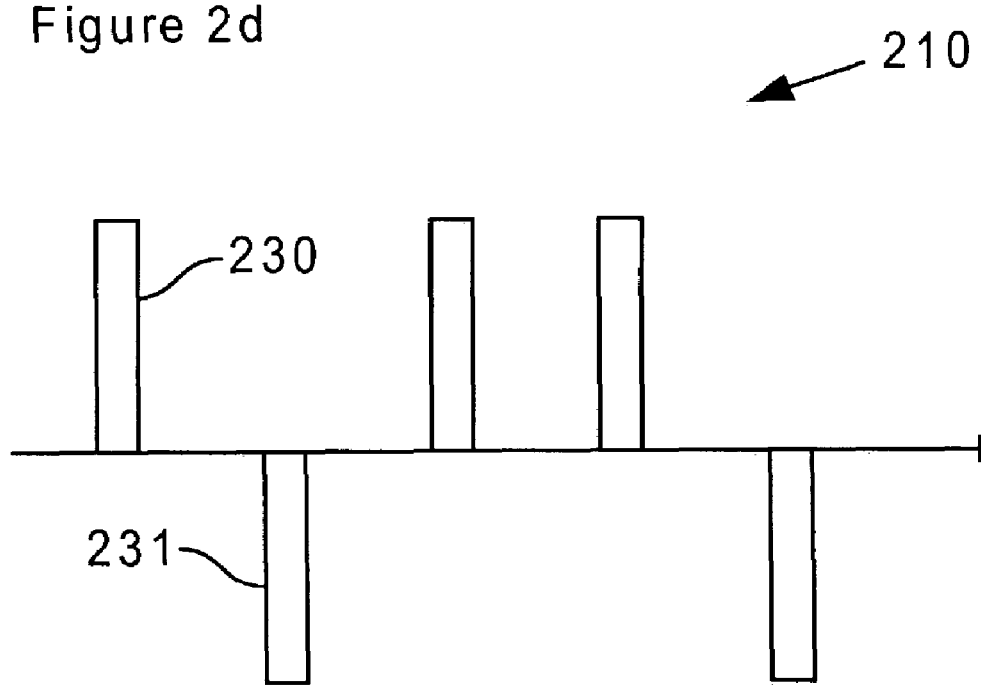

With reference now to FIG. 2d, there is shown the group of pulses 210, wherein the pulses are modulated using bi-phase modulation. FIG. 2d illustrates a case where the phase is varied one of two ways, zero (0) degrees or 180 degrees. For example, a first pulse 230 is at zero degrees, while a second pulse 231 is at 180 degrees.

Figure 3:
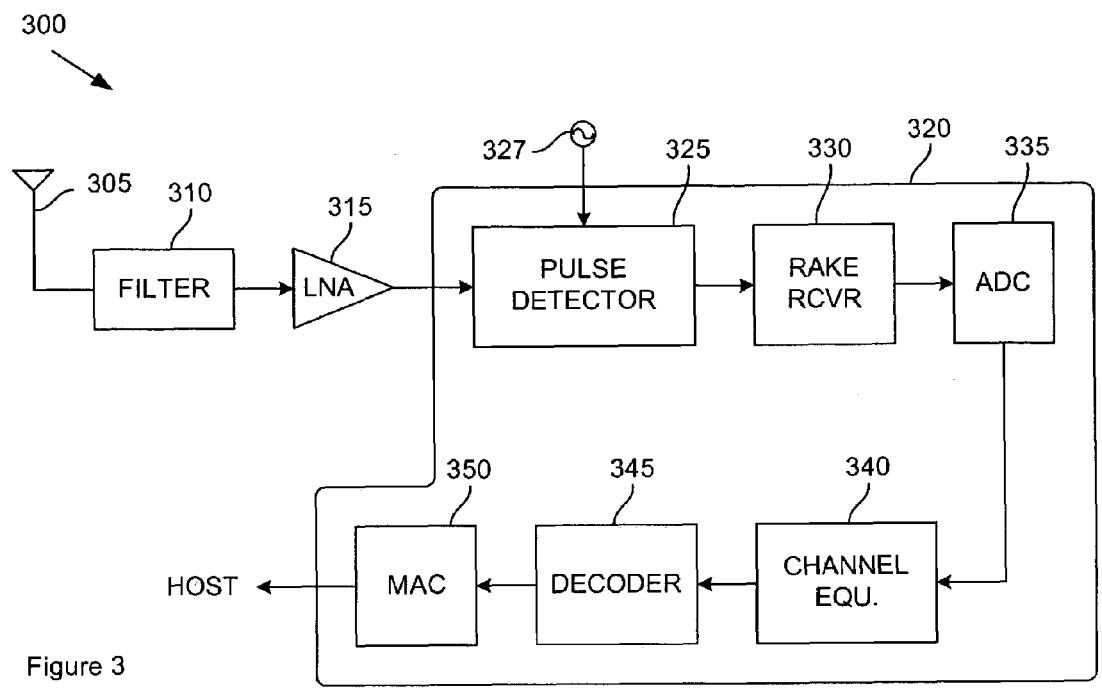
FIG. 3 is a diagram of an exemplary UWB receiver with a switched capacitor rake receiver, according to a preferred embodiment of the present invention.

With reference now to FIG. 3, there is shown a block diagram of an exemplary UWB receiver 300 with a received signal detector according to a preferred embodiment of the present invention. The UWB receiver 300 is displayed partitioned into three major parts; an antenna 305, a high-speed filter 310 and amplifier unit 315(HFA), and a signal processing unit 320. With the exception of the antenna 30, the UWB receiver 300 can be fabricated on a single integrated circuit.

The HFA includes a filter unit 310 and a low-noise amplifier (LNA) 315. The filter unit 310 is used to eliminate any out-of-band and in-band interference. For example, the filter unit 310 can be used to ensure that only signals within the UWB receiver's frequency band of interest progresses further into the UWB receiver 300. The filter unit 310 may also include an adaptive notch filter (not shown) that can be adjusted to eliminate interference that may be inside the UWB receiver's frequency band of interest. For example, if there are other wireless networks operating within the area of the UWB receiver 300, the filter unit 310 can adjust its notch filter to eliminate parts (frequency ranges) of its received signal that contain transmissions from the other wireless networks.

The signal processing unit 320 includes a pulse detector 325, a rake receiver 330, an analog-to-digital converter (ADC) 335, a channel equalizer 340, a decoder 345, and a media access control (MAC) 350. Note that depending on a particular implementation, one or more of the above listed components of the signal processing unit 320 may not be present. For example, the MAC 350 may be placed in a different portion of the UWB receiver 300 or it may not be present at all.

The following are brief descriptions of the functions of the various components of the signal processing unit 320. Certain components will be discussed in greater detail below. The pulse detector 325 is used to detect the reception of the short-duration pulses and to create a value that corresponds to the strength of the received pulse. Previously, the term pulse detector was used to describe a circuit that detects the arrival of a received pulse. Note that the term detector and correlator can be used interchangeably. However, the pulse detector 325 includes a correlator and an integrator. The integrator is used to convert the signal detected by the correlator into a value, normally a voltage or charge that is dependent on the magnitude of the signal. In some implementations, the correlator and the integrator are one in the same and often no clear line of demarcation is drawn between the two.

The rake receiver 330 is used to combine reflections of the received pulse arriving at the receiver at different times (this is commonly referred to as multipath). The ADC 335 converts the value created by the correlator/integrator 325 into a digital sample that can be processed by the remainder of the signal processing unit 320. The channel equalizer 340 is used to adjust (flatten) the frequency response of the received signal (pulse) and the decoder 345 is used to extract information that is encoded into the pulses. Finally, a MAC 350 manages and maintains communications to and from a host device coupled to the UWB receiver 300.

As discussed earlier, a Gaussian pulse is a commonly used short-duration pulse in the streams of short-duration pulses used by-many UWB communications systems. Gaussian pulses have a distinct advantage over many other short-duration pulses in that the product of TIME and bandwidth of the Gaussian pulse is a constant.

Figure 4A:
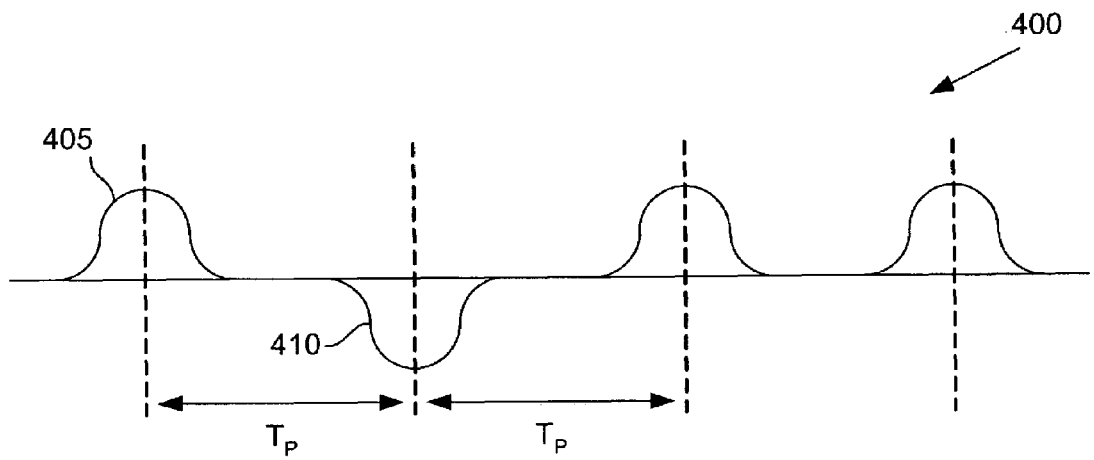
FIGS. 4a and 4b are diagrams of a stream of short duration pulses wherein the pulses are Gaussian pulses and a close-up view of a Gaussian pulse, according to a preferred embodiment of the present invention.
Figure 4B:
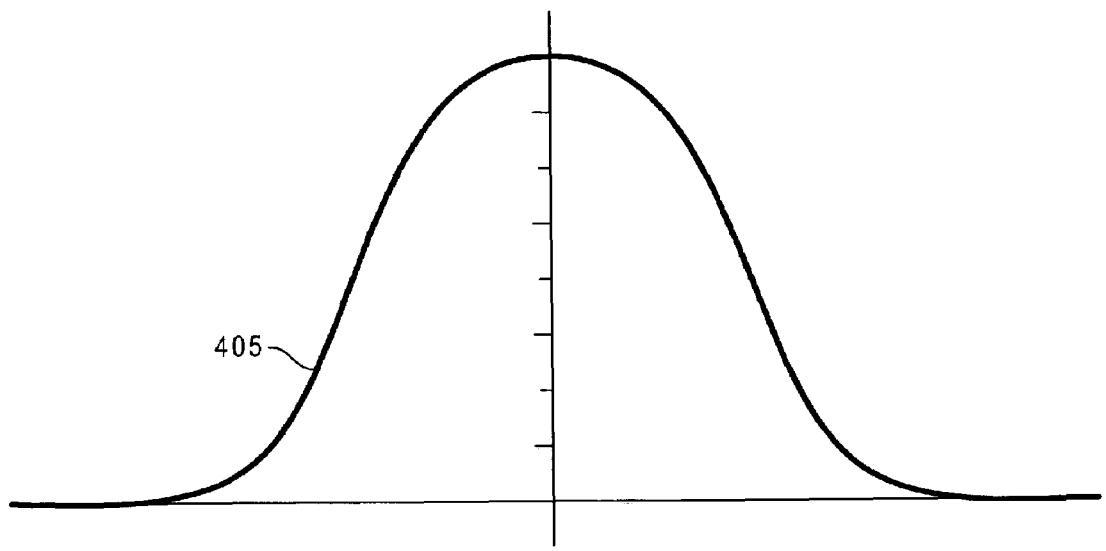

With reference now to FIGS. 4a and 4b, there is shown a stream of short duration pulses 400 and a close-up view of an exemplary analog Gaussian pulse 405, wherein the pulses in the stream of short duration pulses are Gaussian pulses and the stream is modulated using bi-phase modulation according to a preferred embodiment of the present invention. When using bi-phase modulation, the polarity of the pulses is used to transmit the value of the data bit. For example, in the stream 400, three of the pulses (for example, one of the three pulses may be pulse 405) have the same polarity, hence the three data bits represented by the pulses have the same value. A different pulse 410 has a reversed polarity, indicating that the data bit that it represents has a different value. Notice that the inter-pulse spacing, Tp, is constant for each pulse, since bi-phase modulation does not adjust the inter-pulse spacing.

In an UWB communications system, the antennas used to transmit and receive the signals, for example, the antenna 305 (FIG. 3), would typically have sufficient bandwidth to transmit and receive the UWB signals. Depending on how the antennas are implemented they can behave as differentiators or integrators. For example, if an antenna is designed as a constant gain antenna, then it will behave as an integrator and if an antenna is designed as a constant effective aperture, then it will behave as a differentiator.

The following discussion will be based on an UWB communications system with antennas that are designed as constant effective aperture antennas, therefore the antennas operate as differentiators. Note that the present invention can be trivially modified to accommodate different antenna design types. When an UWB communications system uses antennas that behave as differentiators, a Gaussian pulse that is transmitted by a first antenna and then received by a second antenna would have undergone two first differentials, and the signal at the receiver will actually be a second differential of the original Gaussian pulse. Therefore, a Gaussian pulse (or any other pulse for that matter) that is transmitted (and/or received) by an antenna will no longer appear to be a Gaussian pulse. This phenomenon is widely known by those of ordinary skill in the art of the present invention.

If an UWB communications system were being used with antennas that behave as integrators, then the UWB communications system can be modified to transmit the fourth differentials of a Gaussian pulse rather than a Gaussian pulse, then the UWB receiver will receive a third differential of a Gaussian pulse and after the receive antenna, the received pulse would appear to be a second differential of a Gaussian pulse. Alternatively a pulse detection circuit in the receiver can be modified to receive a different type of pulse.

Figure 5:
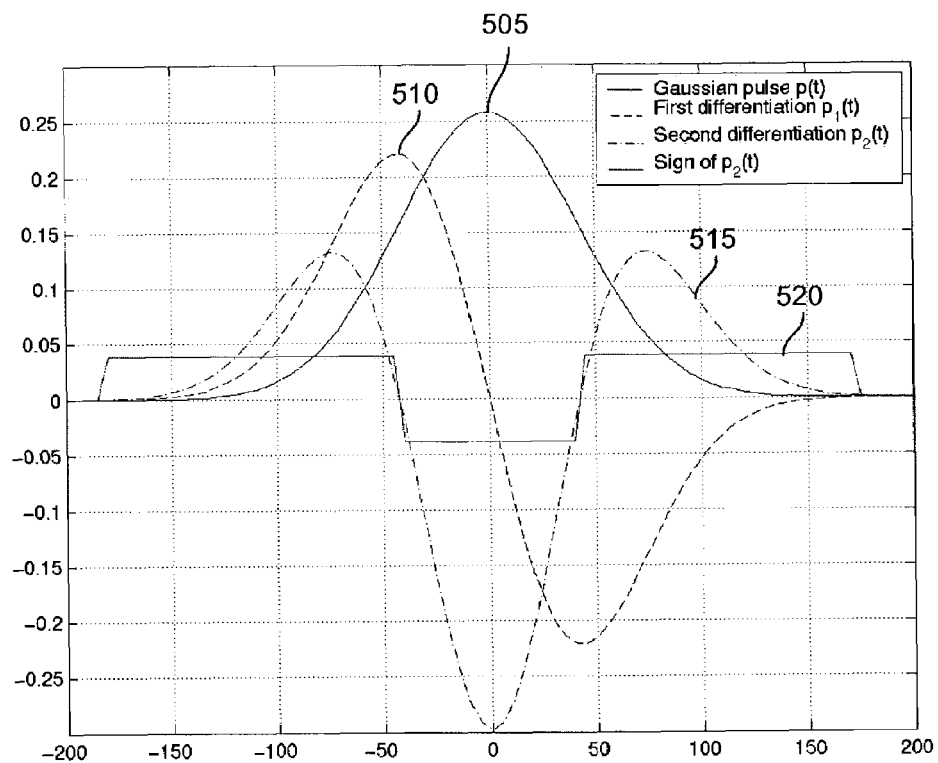
FIG. 5 is a data plot of an exemplary Gaussian pulse along with the Gaussian pulse's first and second derivative, and a sign curve of the second derivative, according to a preferred embodiment of the present invention.

With reference now to FIG. 5, there is shown a data plot diagram of an exemplary Gaussian pulse 505 along with its first and second differentials (510 and 515) of the Gaussian pulse 505 according to a preferred embodiment of the present invention. Note that the Gaussian pulse 505 displayed is a representative of the plurality of Gaussian pulses in a stream of short-duration pulses used in an UWB communications system, and that each of the plurality of Gaussian pulses will appear essentially identical to the Gaussian pulse 505 with exception given to perhaps their polarity and/or magnitude (this varies depending upon the particular modulation technique used by the UWB communications system being examined).

The curve 510 represents the first differential of the Gaussian pulse 505 (hereunder referred to as the first differential curve 510) and displays the slope of the Gaussian pulse 505. For example, at an apex of the Gaussian pulse 505, where the slope goes from a positive value to a negative value, the first differential curve 510 transitions across a zero value line. The curve 515 represents the second differential of the Gaussian pulse 505 (hereunder referred to as the second differential curve 515) and displays the rate of change in the slope of the Gaussian pulse 505 (or the slope of the first differential curve 510). For example, at the tail ends of the Gaussian pulse 505, when the curve slowly rises, the second differential curve 515 has a small value, indicating a slowly changing slope.

Note that the second differential curve 515 represents what an UWB receiver would receive for each Gaussian pulse if an UWB transmitter transmits a stream of short-duration Gaussian pulses, can be difficult to detect. The detection difficulty lies mainly in the detection of the subtle curves of the second differential curve 515. A detector that is capable of rapidly detecting the receipt of the second differential curve 515 would likely be complex and expensive.

A fourth curve 520 displayed in FIG. 5 represents the sign of the second differential curve 515 and will be referred to as the sign curve 520. The sign curve 520 is positive when the sign (or polarity) of the second differential curve 515 is positive and negative when the sign of the second differential curve 515 is negative. The sign curve 520 has the appearance of a simple rectangular wave and is easier to detect with a simple detector. Note that if the UWB communications system is using bi-phase modulation, then some of the Gaussian pulses in the stream of short-duration pulses will have a negative polarity. If this is the case, then sign curves that correspond to the negative polarity Gaussian pulses will appear as complements of the sign curve 520.

Note however, that under circumstances, the channel over which the Gaussian pulse 505 is being transmitted may act as an integrator in and of itself. If this is the case, then the behavior of the channel may counteract one of the two wideband antennas (one at the transmitter and one at the receiver). When this occurs, the received signal will then appear to be a first differential of the Gaussian pulse (perhaps similar to the first differential curve 510).

The detection of occurrences of sign curves, such as the sign curve 520, can be performed through the use of match filters. Match filters use switched capacitors to integrate a current into a charge. The charge is accumulated on the switched capacitors themselves. When there is a greater "match", then the charge accumulated on the switched capacitor is greater. In the case of detecting sign curves, the match filters can be referred to as signed match filters since the matched filters are more interested in matching the signs of the curves then the curves themselves. Match filters and signed match filters are well understood by those of ordinary skill in the art of the present invention.

Figure 6:
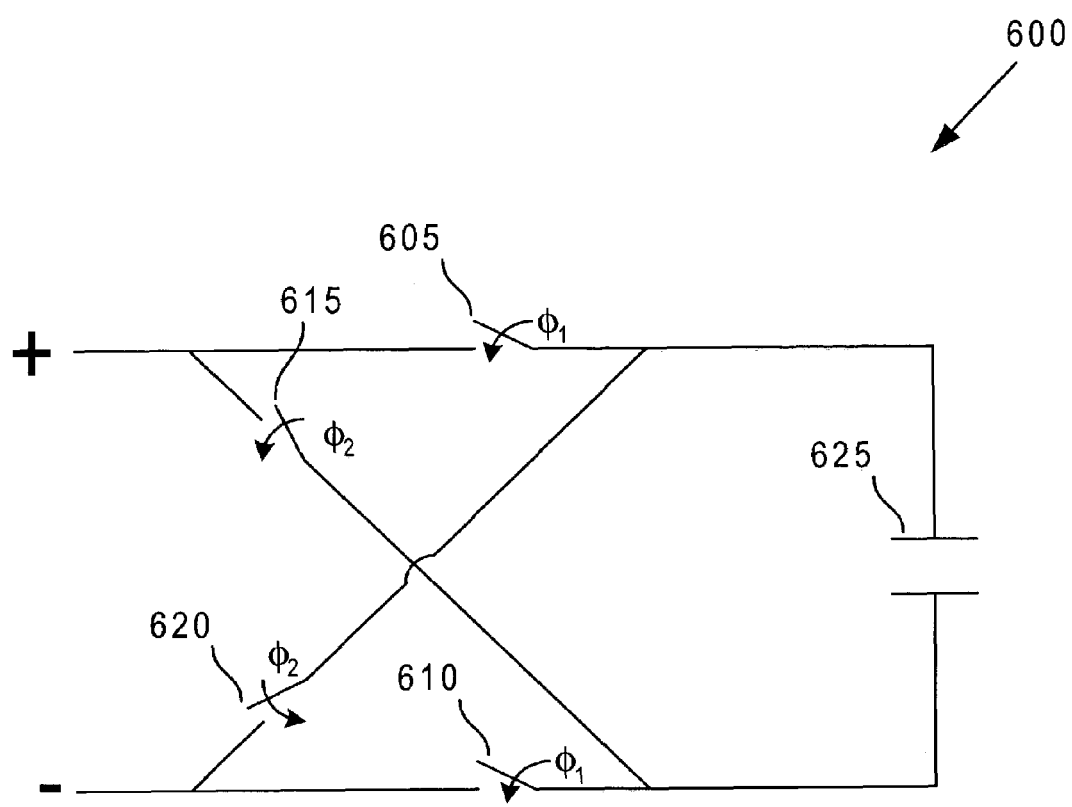
FIG. 6 is a diagram of a signed match filter that is used in correlating and integrating transmitted signals, according to a preferred embodiment of the present invention.

With reference now to FIG. 6, there is shown a block diagram of a signed match filter 600 for use in detecting transmitted signals, according to a preferred embodiment of the present invention. Note that the signed match filter 600, as displayed in FIG. 6, can be used in place of the pulse detector 325 (FIG. 3), or a portion of the pulse detector 325, depending on the modulation scheme used. The signed match filter 600 is made up of a plurality of switches 605, 610, 615, and 620 and a capacitor 625. The switches are controlled by control signals that open and close the switches and the capacitor 625 accumulates a charge whenever there is a voltage difference across the capacitor 625.

The signed match filter 600, as illustrated in FIG. 6, operates with differential mode signals. Differential mode signals are carried on two separate conductors and the actual signal is the difference of the signal carried on the two conductors. Note that the signed match filter 600 can be readily modified to operate-with single ended signals.

The switches operate in pairs, with a first pair (switches 605 and 610) being controlled by a first control signal, $\phi_1$ and a second pair (switches 615 and 620) being controlled by a second control signal, $\phi_2$. According to a preferred embodiment of the present invention, the control signals are active high (although the control signals and switches can also be configured to operate active low), therefore, whenever one of the two control signals is high, the switches controlled by the particular control signal are closed and current may flow. Note that if there is no signal being received while the switches are closed, then no (or very little) current flows.

With reference back to FIG. 5, note that the signed curve 520 has portions when it is a positive value and portions when it is a negative value. When a capacitor (such as capacitor 625 (FIG. 6)) accumulates a charge due to a negative current, the net charge on the capacitor decreases. If the capacitor is permitted to accumulate a negative current, then the net charge on the capacitor would decrease. This can result in a decrease in the overall signal strength detected by the signed match filter 600 (FIG. 6).

With reference back to FIG. 6, notice that the second pair of switches 615 and 620 are arranged in a cross-wised fashion. Therefore, when the second control signal, $\phi_2$, becomes high, the conductors that are connected to the capacitor 625 are reversed. This has a net effect of reversing the polarity of the received signal. Hence, a signal with negative polarity will become positive and vice versa.

When portions of the expected received signal becomes negative, the second pair of switches 615 and 620 can be activated (along with the de-activation of the first pair of switches 605 and 610) to permit the reversing the polarity of the negative portions of the expected received signal. Hence, if the detector is properly aligned with the received signal, the negative portion of the received signal becomes positive and the accumulated charge on the capacitor 625 is increased.

Notice that the signed match filter 600 can be readily adapted for use with a wide variety of different pulses. In order to adapt the signed match filter 600 to other pulses, timing information that specifies the expected behavior of the pulse is needed to control the behavior of the first and second control signals. Examples of the information needed for the timing information includes the duration of the pulse, when (and if) the pulse changes polarity, the duration of the various times when the pulse changes polarity, etc. An example of the first and second control signals for the second derivative of a positive polarity Gaussian pulse is provided below.

Figure 7:
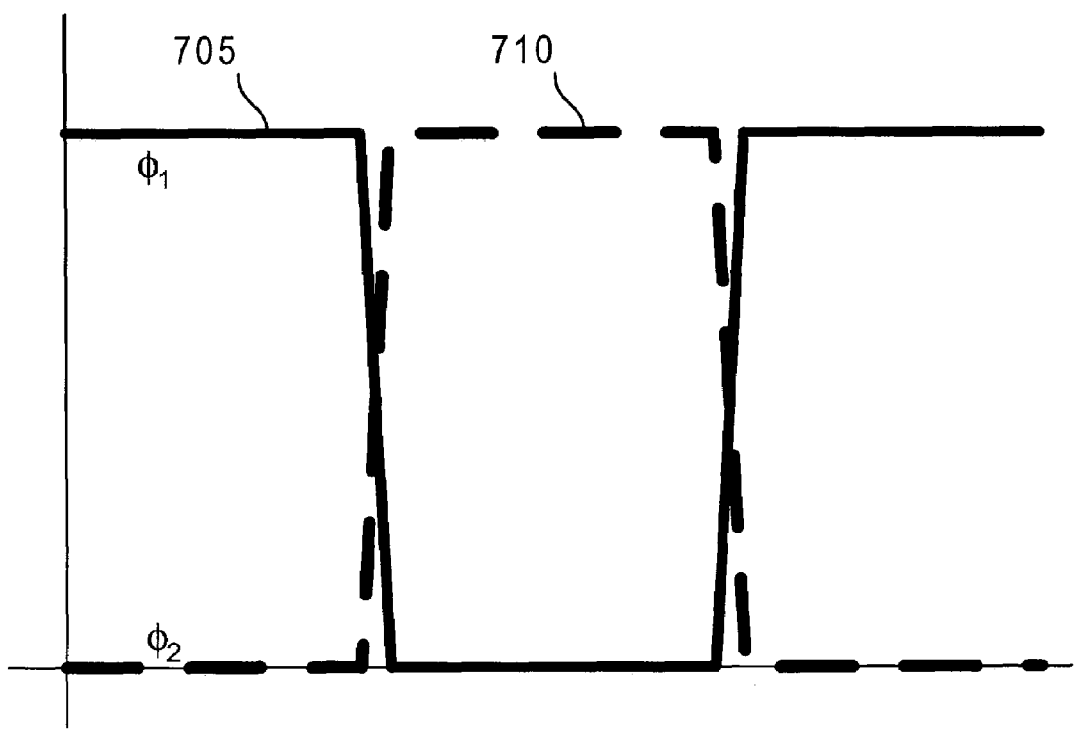
FIG. 7 is a diagram of a pair of control signals used to control the operation of a signed match filter, according to a preferred embodiment of the present invention.

With reference now to FIG. 7, there is shown a diagram illustrating the first and second control signals for the signed match filter 600 displayed in FIG. 6, according to a preferred embodiment of the present invention. A first curve 705 displays the first control signal, $\phi_1$, and a second curve 710 displays the second control signal, $\phi_2$. Note that the two control signals are mutually exclusive, meaning that when one control signal is active, the other control signal is inactive and vice versa. Never are both control signals active simultaneously. If the received signal being detected is of a different profile or shape, the control signals can be modified to meet the profile of the received signal. For example, if the received signal is simply a square wave, then a single control signal may be sufficient to control the signed match filter 600 (FIG. 6), with the particular control signal being active dependant upon the polarity of the received signal. Of course, more complex received signals may necessary require a more complex set of control signals, with more transitions, etc.

According to a preferred embodiment of the present invention, no historical timing information is used in the detection of the received signal. However, since the information conveyed in the streams of short-duration pulses in an UWB communications system is via the pulses themselves, there is an expected arrival time for each pulse in the stream. By setting the expected arrival time of each pulse to be an "on-time" arrival, a signed match filter being used as a pulse detector (for example, the pulse detector 325 (FIG. 3)) will correlate and integrate whatever signal the UWB receiver 300 (FIG. 3) receives at the expected arrival time of each pulse. The UWB receiver 300 may receive exactly the pulse, a portion of the pulse, or no portion of the pulse during the "on-time" arrival.

In an attempt to maximize the signal strength of the received pulse should the received pulse be slightly delayed or advanced, additional signed match filters are set to correlate and integrate whatever the UWB receiver receives a small period of time "earlier" and "later" than the expected arrival time of each pulse. The "earlier" timing is referred to as "early" timing, while the "later" timing is referred to as "late" timing.

Figure 8:
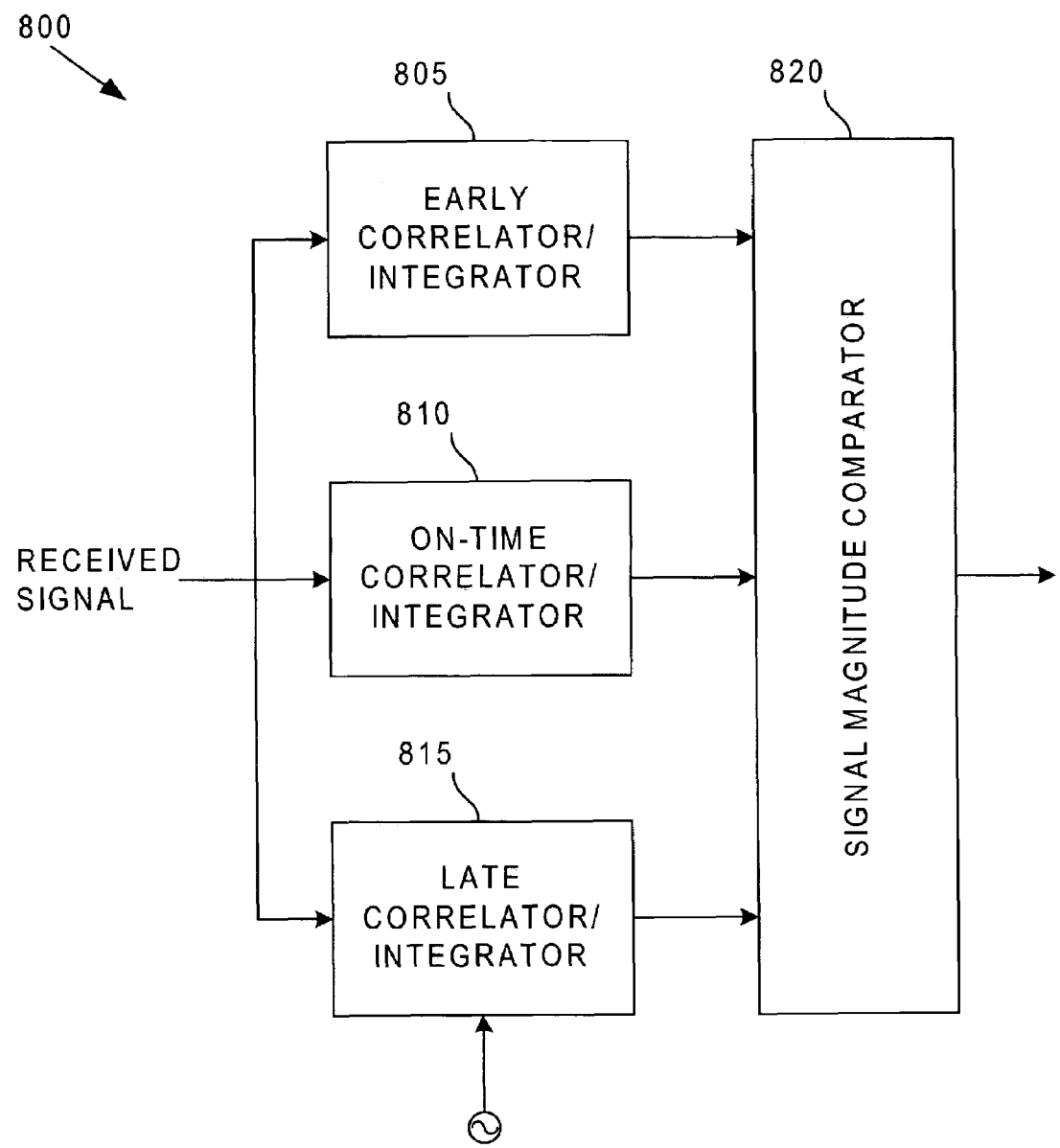
FIG. 8 is a diagram of a pulse detector with a self-adjusting timing mechanism to maximize received signal strength, according to a preferred embodiment of the present invention.

With reference now to FIG. 8, there is shown a block diagram illustrating a pulse detector 800 with a self-adjusting timing mechanism to maximize received signal strength, according to a preferred embodiment of the present invention. The pulse detector 800 with a self-adjusting timing mechanism includes a plurality of correlators/integrators (805, 810, and 815), wherein each correlator/integrator is configured to correlate and integrate the received signal at slightly different times. For example, in the pulse detector 800, there are three correlators/integrators: an early correlator/integrator 805 does its duties a fraction of a pulse width prior to an on-time correlator/integrator 810, which in turn, does its duties a fraction of a pulse width prior to a late correlator/integrator 815. Note that the timing difference between the early and on-time correlators/integrators does not necessarily need to be the same as the-timing difference between the on-time and late correlators/integrators, although it is preferred. It is also preferred that the timing difference be approximately one-half of the duration of the pulse being detected.

The pulse detector 800 is displayed with three correlators/integrators 805, 810, and 815. Three offers a good compromise between performance and hardware complexity. A pulse detector with a larger number of signed match filters can be built, but any performance gain may be offset by the additional hardware requirements. Additionally, a maximum number of correlators/integrators may be limited by the spacing between the pulses, the width of the pulses, and the timing difference between the individual correlators/integrators.

Each one of the early, on-time, and late correlators/integrators 805, 810, and 815 will generate a value that corresponds to what was received by the UWB receiver while it was active. This value is a charge accumulated on a capacitor (for example, capacitor 625 (FIG. 6)) and the magnitude of the charge is dependant upon how closely the actual received pulse matches up with the timing of the individual correlators/integrators 805, 810, 815. Notice that each one of the early, on-time, and late correlators/integrators 805, 810, and 815 receive its signal from the same received signal input and that it only the timing of when their respective switches and capacitors become active that differs between the three.

The pulse detector 800 also includes a signal magnitude comparator 820. The signal magnitude comparator 820 has as its inputs the outputs of the early, on-time, and late correlators/integrators 805, 810, and 815 respectively. The signal magnitude comparator 820 then selects the input with the greatest magnitude and produces that magnitude at its output. Should multiple magnitudes be equal to the maximum value, the signal magnitude comparator 820 will arbitrarily select a value to produce at its output.

According to a preferred embodiment of the present invention, the pulse detector 800 operates continuously, correlating and integrating the early, on-time, and late times as often as possible to measure any received signal and reflection received by the UWB receiver. Because each pulse transmitted by an UWB transmitter has a given duration, the early, on-time, and late correlators/integrators need to operate at least once during each pulse duration to ensure that every signal received by the UWB receiver is measured.

Figure 9:
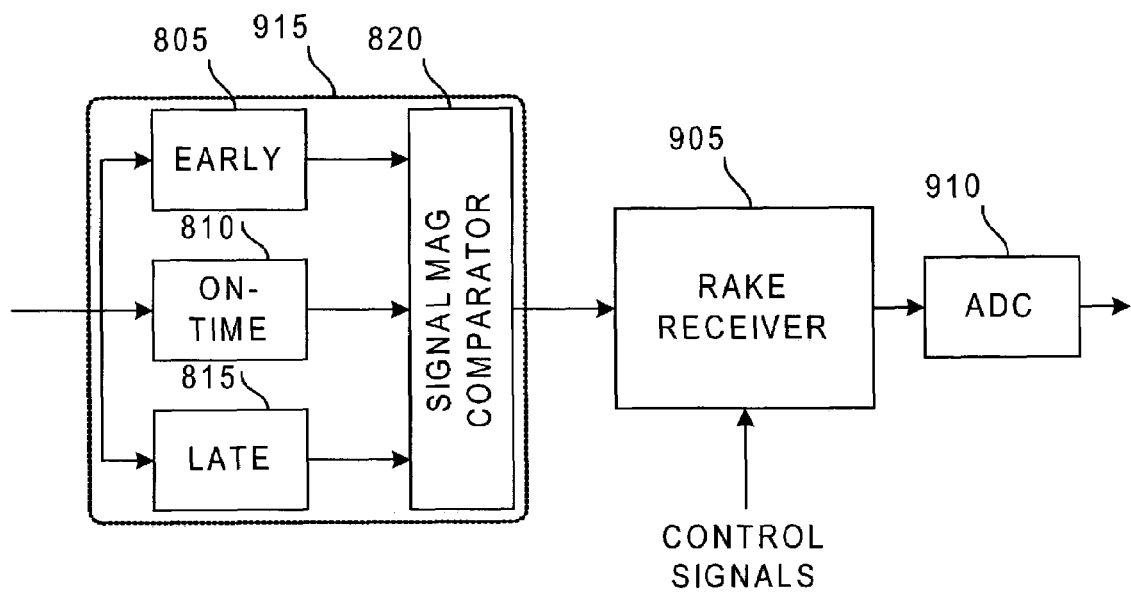
FIG. 9 is a diagram of a portion of a UWB receiver illustrating a rake receiver and a pulse detector, according to a preferred embodiment of the present invention.

With reference now to FIG. 9, there is shown a block diagram illustrating a portion of an UWB receiver with a rake receiver 905 and a pulse detector 915 with a self-adjusting timing mechanism, according to a preferred embodiment of the present invention. Note that the pulse detector 915 with the self-adjusting timing mechanism may be similar to the pulse detector 800, described in FIG. 8. The pulse detector 915 provides to the rake receiver 905 a value corresponding to the strongest signal that one of its three correlators/integrators was able to measure. According to a preferred embodiment of the present invention, the pulse detector 915 is configured so that it will provide such a value to the rake receiver 905 once during each pulse period. Note that the strongest signal may have been measured by a different correlator/integrator during each pulse period. For example, during one pulse period, an on-time correlator/integrator 810 may have measured the strongest signal, while during a subsequent pulse period, a late correlator/integrator 815 may have measured the strongest signal.

The rake receiver 905 then stores the value provided to it by the pulse detector 915. The rake receiver 905 has a plurality of fingers (not shown) that are each used to store a value provided to the rake receiver 905 by the pulse detector 915. The finger chosen based upon a set of control signals. After each of the fingers in the rake receiver 905 (or some predetermined subset of the available fingers) have been used to store the values provided by the pulse detector 915, the stored values are combined and the resulting value is converted into a digital value by an analog-to-digital converter (ADC) 910. According to a preferred embodiment of the present invention, the rake receiver 905 has sufficient fingers to store values provided by the pulse detector for a period of time equivalent to the period of the pulses, with each finger expected to be coupled to the comparator result output for a time equal to the duration of one pulse. Therefore, it is preferred that the number of fingers in the rake receiver 905 be at least equal to the period of the pulses divided by a single pulse duration.

The values stored in the rake receiver 905 is normally combined one of two ways. A first way assumes that each value stored is of equal weight and is called equal gain combining (EGC). A second way can place a different significance (weight) on each of the values and is called maximum ratio combining (MRC). EGC generally an advantage over MRC when it comes to simplicity of implementation, although, it is believed that MRC provides better performance (assuming that the weighting is performed correctly).

Figure 10A:
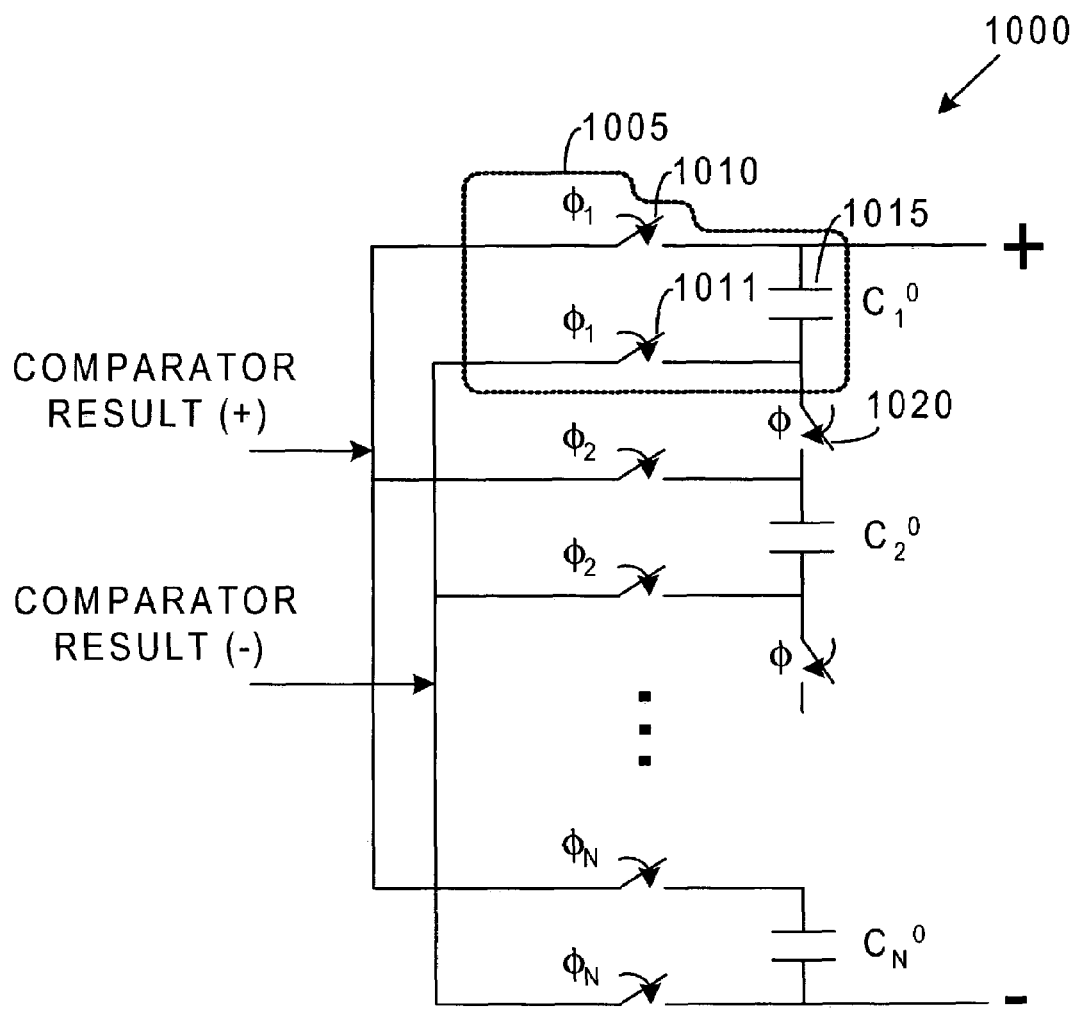
FIGS. 10a and 10b are diagrams illustrating a switched capacitor rake receiver implementing equal gain combining and a timing scheme for control signals controlling the switched capacitors, according to a preferred embodiment of the present invention.

With reference now to FIG. 10a, there is shown a diagram illustrating a detailed view of a hardware rake receiver 1000 implementing equal gain combining, according to a preferred embodiment of the present invention. The hardware rake receiver 1000 shown in FIG. 10a may be used as the rake receiver 905 (FIG. 9). As stated, the hardware rake receiver 1000 implements equal gain combining (EGC) when it combines the various values stored on its fingers. EGC means that all of the values stored on the fingers are given the same weight (or significance) when the values are combined.

As discussed previously, the hardware rake receiver 1000 is implemented using switched capacitors. The use of switched capacitors enables the implementation of a hardware rake receiver with a large number of fingers while maintaining implementation simplicity. The hardware rake receiver 1000 is made up of N fingers (for example, finger 1005), where N is the total number of fingers. Each finger (for example, finger 1005) is created from a pair of switches (for example, switches 1010 and 1011) and a storing capacitor (for example, storing capacitor 1015). Each finger is coupled to an input that carries an output of a pulse detector (for example, pulse detector 915 (FIG. 9)), which is the output of the signal magnitude comparator 820 (FIG. 9). According to a preferred embodiment of the present invention, the output of the signal magnitude comparator 820 is in the form of a differential signal, with a comparator result (+) and a comparator result (−) being provided to the hardware rake receiver 1000. A single ended version of the hardware rake receiver 1000 can be created from the differential signal mode version displayed in FIG. 10a with minor modifications.

The two switches 1010 and 1011 are preferably controlled by a single control signal. The switches 1010 and 1011 are open when the finger 1005 is not coupled to the comparator result output and are closed when the finger 1005 is coupled to the comparator result output. Note that each of the fingers in the hardware rake receiver 1000 is controlled by a different control signal and that when one finger is being coupled to the comparator result output, none of the remaining N−1 fingers are coupled to the comparator result output.

In finger 1005 for example, when the switches 1010 and 1011 are closed, the comparator result output is coupled to the storing capacitor 1015 and the storing capacitor 1015 then accumulates a charge that is dependent on the magnitude of the signal on the comparator result output. The switches 1010 and 1011 are closed for a specified duration of time, preferably, equal to the duration of one pulse. Note that the magnitude of the comparator result output is a function of the signal strength of single pulse, therefore, if the signal strength of the single pulse is strong, then a larger charge is accumulated on the storing capacitor 1015. Additionally, the amount of charge stored in the storing capacitor also depends upon the capacitance of the storing capacitor. It is preferred that the storing capacitors for each finger have equal capacitances.

According to a preferred embodiment of the present invention, the storing capacitors of each finger are arranged in a serial fashion. However, the storing capacitors of each finger, for example, storing capacitor 1015 of finger 1005, are kept separated (electrically) from the storing capacitors of other fingers by a series of switches, for example, switch 1020. There are a total of N−1 switches and all are preferably controlled by a single control signal, $\phi$. During the storing of the values provided by the pulse detector, the switches (such as switch 1020) are all open and the storing capacitors are de-coupled. Once the storing stage completes, then the switches close and the storing capacitors are electrically coupled together. This results in a net charge equal to a sum of the charge stored on each of the storing capacitors. This net charge is read-off and provided to an analog-to-digital converter (ADC) (for example, ADC 910) to create a digital value that is representative of the received pulse and its reflections.

According to a preferred embodiment of the present invention, the storing capacitors of the fingers are of equal capacitance. This is needed to implement ERC. Should there be a desire to implement unequal gain combining, the capacitances of the various storing capacitors can be varied. For example, the finger that stores the value associated with the received pulse (typically the first finger) may have a storing capacitor with the largest capacitance and the storing capacitor for subsequent fingers can have decreasing capacitances to place less and less weight on reflections that are received further and further away from the initial reception of the received pulse.

Figure 10B:
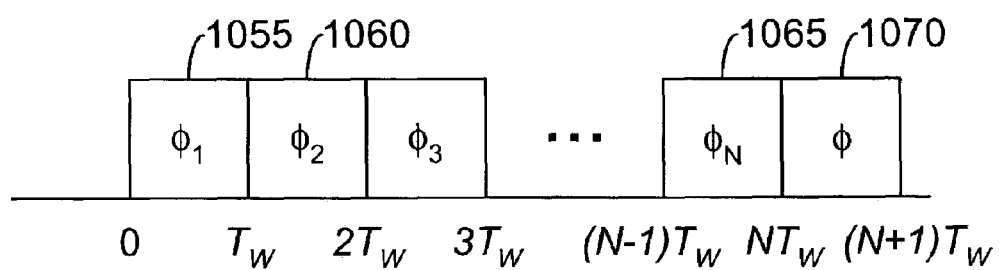

With reference now to FIG. 10b, there is shown a timing diagram illustrating active periods for control signals that control switches (for example, switches 1010 and 1011 (FIG. 10a)) that couple the comparator result output to the fingers of a rake receiver (for example, rake receiver 1000 (FIG. 10a), according to a preferred embodiment of the present invention. FIG. 10b illustrates a sequence of pulses (for example, pulses 1055, 1060, and 1065), wherein each of the pulses represents when a corresponding control signal is active. For example, pulse 1055 represents the active period for control signal $\phi_1$. In a time period when pulse 1055 is high, the control signal $\phi_1$ is active and closes a pair of switches (for example, switches 1010 and 1011 (FIG. 10a)) to which it is coupled. The closing of the switches 1010 and 1011 allows the comparator result output to be coupled to a storing capacitor (for example, storing capacitor 1015 (FIG. 10a) and any current on the comparator result output is accumulated on the storing capacitor 1115 in the form of a charge.

As discussed previously, each finger is preferred to be coupled to the comparator result output for a time equal to the duration of a single received pulse. Therefore, each control single pulse is high for one received pulse duration. After one control signal pulse (for example, pulse 1055) has been active for one received pulse duration and becomes inactive, a subsequent pulse (for example, pulse 1060) becomes active. It is preferred that for any given time, there is one active pulse. This is because when there is a time when there are no active pulses, then there are no storing capacitors coupled to the comparator result output, resulting in a loss of a possible output by the comparator.

After the N control signals have coupled their respective storing capacitors to the comparator result (both (+) and (−)), an additional control signal, $\phi$, becomes active. The control signal, $\phi$, couples the N storing capacitors together. The coupling of the storing capacitors to produce a cumulative charge is described in greater detail in the description of FIG. 10a.

Figure 11A:
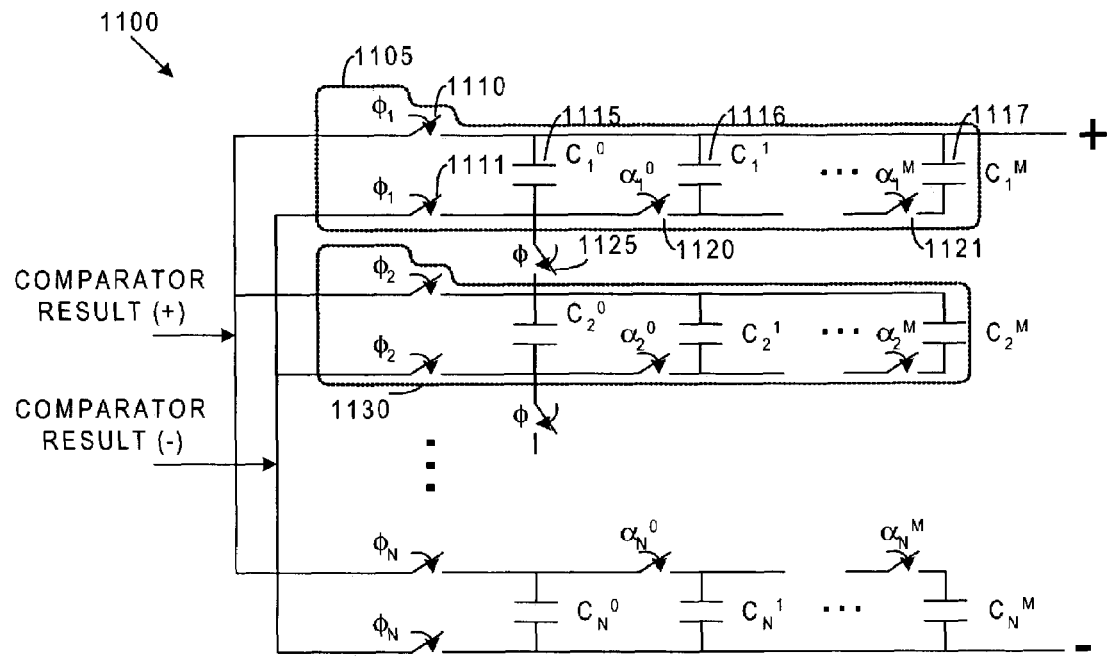
FIGS. 11a and 11b are diagrams illustrating a switched capacitor rake receiver implementing maximum ratio combining and a decoder for applying weights to the switched capacitors, according to a preferred embodiment of the present invention.

With reference now to FIG. 11a, there is shown a figure illustrating a hardware rake receiver 1100 implementing maximum ratio combining (MRC), according to a preferred embodiment of the present invention. MRC places different weights (significance) on different values stored in the various fingers. The intent of MRC is such that if information is known about certain reflections (and the received pulse as well) that the UWB receiver will receive, then greater weight can be placed on the stored values corresponding to the reflections. In effect, MRC places more importance on certain stored values for which it may have more certainty.

Again, the hardware rake receiver 1100 is preferably implemented using switched capacitors. The hardware rake receiver 1100 is made up of N fingers (for example, finger 1105), where N is the total number of fingers. Each finger (for example, finger 1105) is created from a pair of switches (for example, switches 1110 and 1111), a storing capacitor (for example, storing capacitor 1115) and a plurality of weighting capacitors (for example, weighting capacitors 1115, 1116, and 1117) with the weighting capacitors separated by weighting switches (for example, weighting switches 1120 and 1121).

According to a preferred embodiment of the present invention, the output of the signal magnitude comparator 820 is in the form of a differential signal, with a comparator result (+) and a comparator result (−) being provided to the hardware rake receiver 1100. A single ended version of the hardware rake receiver 1100 can be created from the differential signal mode version displayed in FIG. 11a with minor modifications. The storing 1115 and weighting capacitors 1116 and 1117 are arranged in such a fashion that they span the comparator result (+) and comparator result (−) conductors. The weighting switches 1120 and 1121 are used to decouple the weighting capacitors 1116 and 1117 from one another and the storing capacitor 1115. For example, weighting switch 1120 decouples weighting capacitor 1116 from storing capacitor 1115. The weighting switches 1120 and 1121 can be located either along the comparator result (+) or comparator result (−) conductors of the differential signal pair, with the comparator result (−) conductor being the preferred choice.

After the storing capacitor (for example, storing capacitor 1115) stores a charge proportional to the value presented to it by the comparator result output, the weighting switches (for example, weighting switches 1120 and 1121) can close (in some predetermined order) so that the charge stored in the storing capacitor 1115 can be shared with the weighting capacitors (for example, weighting capacitors 1116 and 1117). The weighting switches are controlled by control signals $a(\alpha_i^0, \ldots, \alpha_i^M)$ respectively, where M is the number of weighting capacitors and i is the number of the rake receiver finger. The amount of charge shared depends upon the capacitance of the storing 1115 and weighting capacitors 1116 and 1117 and the number of weighting capacitors coupled to the storing capacitor. For example, if the weighting capacitors have the same capacitance as the storing capacitor and there were a total of two weighting capacitors coupled to the storing capacitor, then the net charge remaining on the storing capacitor would be approximately ⅓ of its original amount.

According to a preferred embodiment of the present invention, each finger (for example, fingers 1105 and 1130) have weighting switches that are controlled by different control signals, so that a different number of weighting capacitors can be coupled to the storing capacitors for each finger of the rake receiver 1100. It is by varying the number of weighting capacitors coupled to the storing capacitor that a different amount of charge is placed on the storing capacitor and hence a different weight is placed on the value stored on a particular finger. For example, if no weighting capacitors are coupled to a particular storing capacitor, then the storing capacitor will maintain the entire charge stored on it and have a greater net effect on the overall value generated by the rake receiver 1100 when the various storing capacitors are electrically coupled together and a net charge is read-off. If on the other hand, a large number of weighting capacitors is coupled to a storing capacitor, then a significant portion of the charge initially stored on the storing capacitor will be removed and reducing the charge contribution of the storing capacitor.

As displayed in FIG. 11*a*, the weighting capacitors (for example, weighting capacitors 1116 and 1117) for a single rake receiver finger are sequentially coupled to the storing capacitor (for example, storing capacitor 1115) via a chain of weighting switches (for example, weighting switches 1120 and 1121). As such, in order to couple more than one weighting capacitor to the storing capacitor, the weighting capacitors should be coupled to each other. This implies that if one (or more) of the weighting switches between the weighting capacitors are open, then (as displayed in FIG. 11*a*), the weighting capacitors to the right of the left most weighting switch that is open are not coupled to the storing capacitor, regardless of whether or not their own weighting switch is closed. According to a preferred embodiment of the present invention, if an arbitrary number of weighting capacitors, Z, is to be coupled to a storing capacitor, then the first Z weighting capacitors (starting from left to right as displayed in FIG. 11*a*) should have their weighting switches closed and the (Z+1)-th weighting switch should be open. This linear behavior is commonly referred to as thermometer scaling.

Note that the rake receiver 1100 implementing MRC, as illustrated in FIG. 11*a*, can be used to implement a rake receiver that implements EGC (such as the rake receiver 1000 (FIG. 10*a*). This can be achieved by keeping all of the weighting switches (for example, weighting switches 1120 and 1121 and others) open during operation. When this is done, none-of the weighting capacitors (for example, weighting capacitors 1116 and 1117) are coupled to the storing capacitors (for example, storing capacitor 1111) and no stored charge is removed from the storing capacitors. Alternatively, if a consistent number of weighting capacitors is coupled to each storing capacitor in each finger (for example, fingers 1105 and 1130), then EGC is also implemented in the rake receiver 1100 implementing MRC.

Figure 11B:
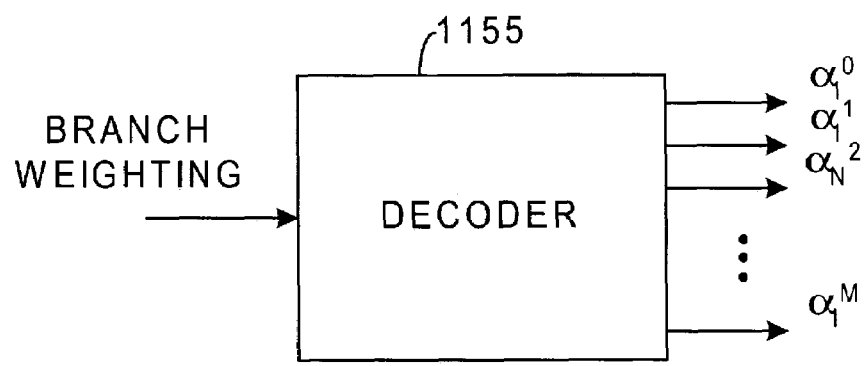

With reference now to FIG. 11*b*, there is shown a diagram illustrating a control signal generator for the weighting control signals, according to a preferred embodiment of the present invention. The control signal generator, as illustrated in FIG. 11*b*, includes a decoder 1155 that has an input, "Branch Weighting", and a plurality of outputs, $\alpha_i^0, \ldots, \alpha_i^M$, which are the weighting control signals. According to a preferred embodiment of the present invention, the control signal generator generates a set of outputs that may be different for each rake receiver finger. When provided with a "Branch Weighting", the decoder 1155 produces a set of outputs that is a function of the "Branch Weighting". According to a preferred embodiment of the present invention, the control signal generator is provided with a "Branch Weighting" for a specific rake receiver finger i immediately after that particular finger has been coupled to the comparator result (+) and comparator result (−) signal lines.

Figure 12A:
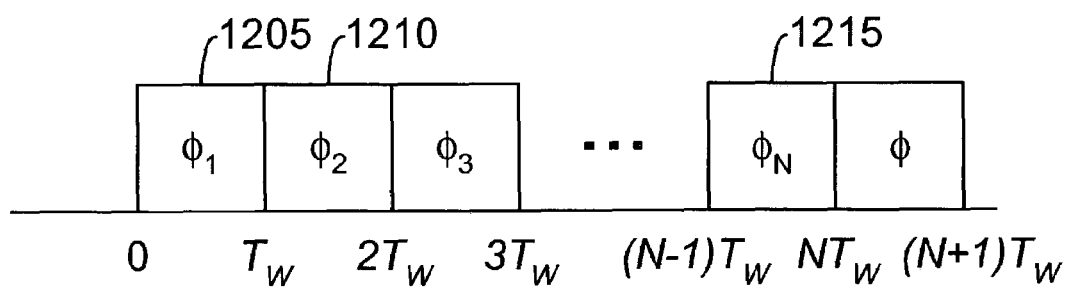
FIGS. 12a and 12b are diagrams illustrating the timing of control signals used to control the operation of the rake receiver and the use of the rake receiver to combine the received pulse and its reflections to increase the signal strength of the received pulse, according to a preferred embodiment of the present invention.

With reference now to FIG. 12*a*, there is shown a timing diagram illustrating active periods for control signals that control switches (for example, switches 1110 and 1111 (FIG. 11*a*)) that couple the comparator result output to the fingers of a rake receiver (for example, rake receiver 1100 (FIG. 11*a*), according to a preferred embodiment of the present invention. FIG. 12*a* illustrates a sequence of pulses (for example, pulses 1205, 1210, and 1215), wherein each of the pulses represents when a corresponding control signal is active. For example, pulse 1205 represents the active period for control signal $\phi_1$. In a time period:when pulse 1205 is high, the control signal $\phi_1$ is active and closes a pair of switches (for example, switches 1110 and 1111 (FIG. 11*a*)) to which it is coupled. The closing of the switches 1110 and 111 allows the comparator result output to be coupled to a storing capacitor (for example, storing capacitor 1115 (FIG. 11*a*) and any current on the comparator result output is accumulated on the storing capacitor 1115 in the form of a charge.

As discussed previously, each finger is preferred to be coupled to the comparator result output for a time equal to the duration of a single received pulse. Therefore, each control single pulse is high for one received pulse duration. After one control signal pulse (for example, pulse 1205) has been active for one received pulse duration and becomes inactive, a subsequent pulse (for example, pulse 1210) becomes active. It is preferred that for any given time, there is one active pulse. This is because when there is a time when there are no active pulses, then there are no storing capacitors coupled to the comparator result output, resulting in a loss of a possible output by the comparator.

After the N control signals have coupled their respective storing capacitors to the comparator result (both (+) and (−)), an additional control signal, $\phi$, becomes active. The control signal, $\phi$, couples the N storing capacitors together. The coupling of the storing capacitors to produce a cumulative charge is described in greater detail in the description of FIG. 10*a*.

Figure 12B:
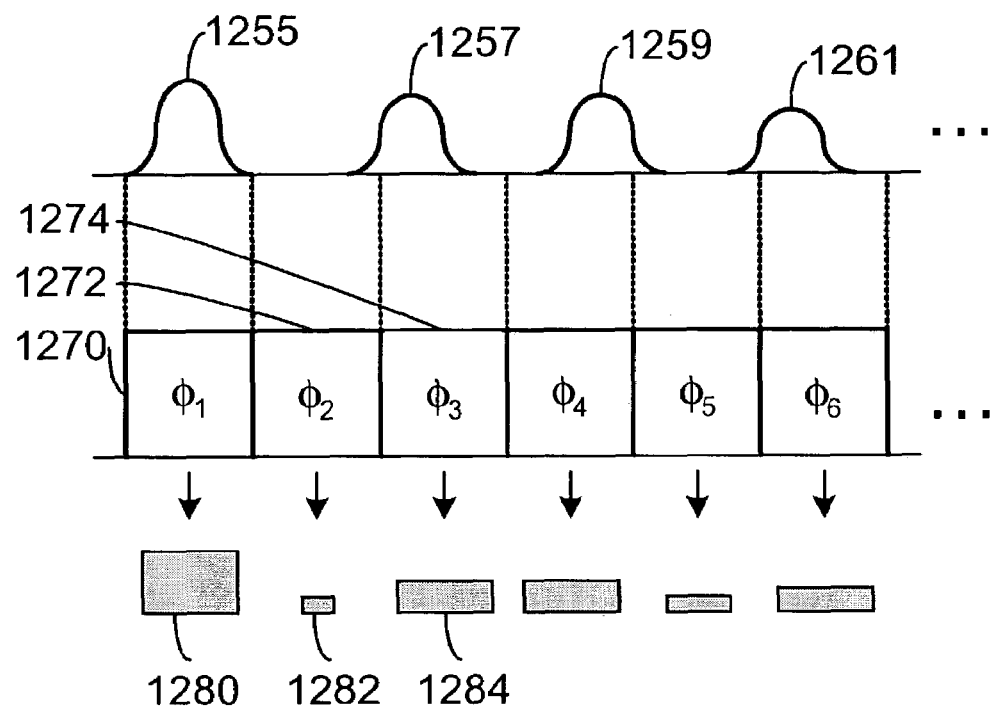

With reference now to FIG. 12*b*, there is shown a diagram illustrating the relationship between a received pulse 1255 and some of its possible reflections (for example, reflection 1257, 1259, and 1261) that are received by a UWB receiver and the timing of the control signals for a rake receiver and the resulting charges stored on various storing capacitors, according to a preferred embodiment of the present invention. The sequence of pulses (the received pulse 1255 and its possible reflections 1257, 1259, and 1261) represent a possible scenario wherein a transmitted pulse is received, along with three possible reflections. Note that as illustrated, the signal magnitudes of the reflections are smaller than the magnitude of the received pulse 1255.

A sequence of square pulses 1270 represents the active periods of the control signals controlling the fingers of a rake receiver, for example, rake receiver 1100. Note that the reflections may not arrive in synchrony with the individual active periods of the control signals. For that matter, the received pulse 1255 may not arrive in synchrony with an active period of a control signal, although the illustration shows that the received pulse 1255 is in synchrony with an active pulse representing control signal $\phi_1$. The misalignment between the arrival of the received pulse and it reflections and the control signals is compensated for by the fact that there are no intervals of time when there isn't a control signal that is active.

Directly beneath the sequence of square pulses 1270 representing the active periods of the control signals are shaded boxes (for example 1280, 1282, and 1284) representing an amount of charge stored on respective storing capacitors. With larger shaded boxes indicating a larger amount of charge. Notice that the received pulse 1255 is precisely aligned with the active pulse representing control signal $\phi_1$, therefore a large charge is stored on the respective storing capacitor. The first reflection 1257 is initially received when the active pulse representing control signal $\phi_2$ is high, therefore, only a small charge is stored on the respective storing capacitor, with the remainder of the first reflection 1257 being received while the control signal $\phi_3$ is high (hence the shaded box 1284 is larger than the shaded box 1282).

After the N fingers (not all N control signals are shown in FIG. 12*b*) of the rake receiver have had an opportunity to store a charge that is proportional to the comparator result output, the charges stored in the respective storing capacitors may be weighed depending on some predetermined scheme and then combined to produce a single net charge that is representative of the received pulse 1255 and its reflections 1257, 1259, and 1261 (and any other reflections that may arrive later, but are not displayed in FIG. 12*b*).

Figure 13:
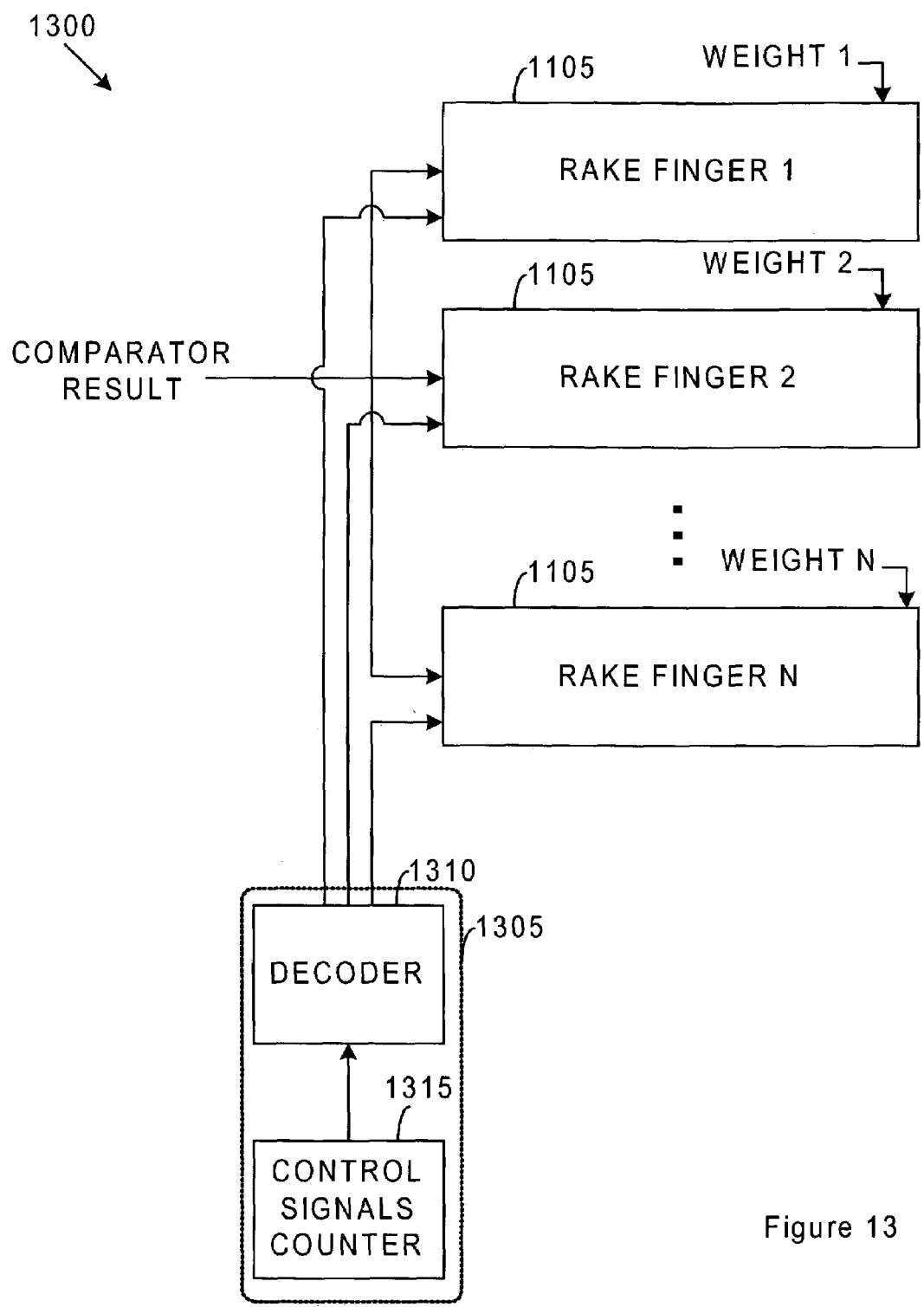
FIG. 13 is a diagram illustrating a high level view of a rake receiver with a control signal generator, according to a preferred embodiment of the present invention.

With reference now to FIG. 13, there is shown a block diagram illustrating a high level view of an implementation of a rake receiver 1300, according to a preferred embodiment of the present invention. The rake receiver 1300 includes N rake fingers which may be similar to the rake fingers 1105 described in FIG. 11*a* (or rake fingers 1005 described in FIG. 10*a*) arranged in such a way that the comparator result output is provided to each of them. Note that as described previously, only one of the N rake fingers is actually receiving the comparator result output at any given time.

This is achieved via the use of control signals that are used to open and close switches present in each of the rake fingers. A control signal generator 1305 can be used to generate the control signals that are used to open and close the switches. A counter 1315, preferably configured to count from 1 to N (or from 0 to N−1) is used to keep track of the particular finger that is coupled to the comparator result output. When the counter reaches the value N (or N−1), the subsequent value of the counter 1315 will be 1 (or 0). The counter 1315 has an output that is provided to a decoder 1310. The decoder 1310 decodes the output of the counter 1315 and activates one of its N outputs, with the remaining N−1 outputs being held inactive. The particular output activated depends upon the value of the output of the counter 1315. The decoder 1310 can be implemented as a 1 to N de-multiplexer where the output of the counter 1315 is the de-multiplexer's select lines. Other implementations are possible for the control signal-generator 1305, such as a circular switch that connects an active signal value to one of N outputs each time that the circular switch receives a change signal.

Should the rake receiver 1300 implement MRC (or if it is implementing EGC using a rake receiver capable of implementing MRC), then each of the N figures can have an input that specifies the weight that is placed on each finger. The weight input determines the number of weighting switches (not shown) that are to be closed to couple the storing capacitor (not shown) to the weighting capacitors (not shown). Note that if all N weight inputs are equal, then the MRC rake receiver implements EGC. Alternatively, each of the N fingers can have a memory that can be used to store the finger's weight and the weight can be hard programmed into the memory or loaded into the memory whenever the need to change the weights arise.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit comprising:
   a signal input;
   a plurality of fingers coupled to the signal input, each finger comprising:
   a first switch controlled by a control signal, the first switch to decouple the finger from the signal input;
   a storing capacitor coupled to the first switch, the storing capacitor to accumulate a charge when the finger is coupled to the signal input; and
   a second switch coupled to the storing capacitor, the second switch to couple the storing capacitor to another storing capacitor in an adjacent finger.

2. The circuit of claim 1, wherein the first switch of each finger is controlled by a different control signal.

3. The circuit of claim 2, wherein the control signals are arranged so that only one finger is coupled to the signal input at a given time.

4. The circuit of claim 1, wherein each finger further comprises at least one weighting capacitor switchably coupled to the storing capacitor, the weighting capacitor to share the charge with the storing capacitor when the weighting capacitor is coupled to the storing capacitor.

5. The circuit of claim 4, wherein each weighting capacitor is coupled to the storing capacitor via a switch that is controlled by a different control signal.

6. The circuit of claim 4, wherein each finger has a same number of weighting capacitors.

7. The circuit of claim 6, wherein each finger may be coupled to a different number of weighting capacitors.

8. The circuit of claim 1, wherein a signal provided by the signal input is a differential mode signal carried on two conductors, wherein the first switch is two switches, one switch per conductor, and wherein the storing capacitor is coupled across the two conductors.

9. The circuit of claim 1, wherein the control signals are configured so that each finger is coupled to the signal input for a specified period of time, and wherein when one finger finishes being coupled to the signal input, another finger is coupled to the signal input.

10. The circuit of claim 9, wherein a signal provided by the signal input is a stream of pulses with a given periodicity, and wherein after each finger has been coupled to the signal input, the storing capacitors are coupled together and a net charge is created from the charge accumulated in each storing capacitor.

11. The circuit of claim 10, wherein the charges stored on the storing capacitors are reset after the storing capacitors are coupled together and the net charge is created.

12. The circuit of claim 9, wherein a signal provided by the signal input is a stream of pulses with a given periodicity, and wherein the specified period of time multiplied by a total number of fingers, N, is equal to one period.

13. An ultra-wideband (UWB) receiver comprising:
a signal input;
a pulse detector coupled to the signal input, the pulse detector containing circuitry to maximize a signal strength of a signal provided by the signal input;
a rake receiver coupled to the pulse detector, the rake receiver comprising a plurality of fingers coupled to an output of the pulse detector, each finger comprising
a first switch controlled by a control signal, the first switch to decouple the finger from the signal input;
a storing capacitor coupled to the switch, the storing capacitor to accumulate a charge when the finger is coupled to the signal input;
a second switch coupled to the storing capacitor, the second switch to couple the storing capacitor to another storing capacitor in an adjacent finger; and
the UWB receiver further comprising a signal processing unit coupled to the rake receiver, the signal processing unit containing circuitry to convert an analog signal into a digital bit stream and decode the digital bit stream into a data stream.

14. The UWS receiver of claim 13, wherein each finger further comprises at least one weighting capacitor switchably coupled to the storing capacitor, the weighting capacitor to share the charge with the storing capacitor when the weighting capacitor is coupled to the storing capacitor.

15. The UWB receiver of claim 13, wherein a signal provided by the signal input is a stream of pulses with a given periodicity, wherein after each finger has been coupled to the signal input, the storing capacitors are coupled together and a net charge is created from the charge accumulated in each storing capacitor, and wherein the net charge is converted into a digital value by an analog-to-digital converter (ADO) in the signal processing unit.

16. The UWB receiver of claim 15, wherein the ADO produces a digital value each period.

* * * * *